United States Patent Office 3,637,694
Patented Jan. 25, 1972

3,637,694
4,5,6-TRICHLORO-2-CHLOROCARBONYL-PYRIMIDINE
Gunther Beck and Hans Holtschmidt, Leverkusen, Germany, assignors to Farbenfabriken Bayer Aktiengesellschaft, Leverkusen, Germany
No Drawing. Filed Mar. 14, 1969, Ser. No. 807,437
Claims priority, application Germany, Mar. 25, 1968,
P 17 70 049.1
Int. Cl. C07d 51/36
U.S. Cl. 260—251                                   6 Claims

ABSTRACT OF THE DISCLOSURE

A process for the production of 4,5,6-trichloro-2-chlorocarbonyl-pyrimidine by reacting 4-morpholino-propionitrile with chlorine, optionally in the presence of ultraviolet radiation, followed by heating in the absence of chlorine, is disclosed. The compound finds utility in the production of reactive dyestuffs.

---

The object of the invention relates to 4,5,6-trichloro-2-chlorocarbonyl-pyrimidine of the formula

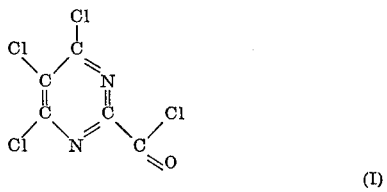

(I)

The object of the invention also comprises a process for the production of 4,5,6-trichloro-2-chlorocarbonyl-pyrimidine, which is characterised by reacting 4-morpholino-propionitrile of the formula

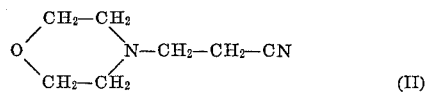

(II)

at temperatures of about 0° C. to about 80° C. with an excess of gaseous chlorine followed by heating to temperatures of about 150 to about 300° C., preferably to about 200–250° C., in the absence of chlorine until 4,5,6-trichloro-2-chlorocarbonylpyrimidine is formed.

The process for the chlorinating treatment of 4-morpholino-propionitrile is carried out in the presence or absence of inert solvents, optionally under ultra-violet irradiation. Catalysts, such as iron (III) chloride, iron antimony (III) chloride, may concurrently be used.

4-morpholino-propionitrile is known. It is prepared, for example, by the addition of morpholino on to acrylonitrile.

4-morpholino-propionitrile is preferably used in the form of a free base, but it can also be used in the form of its hydrohalides, preferably its hydrochloride.

The process according to the invention is generally carried out in such a manner that 4-morpholino-propionitrile is mixed with a solvent followed by the introduction of gaseous chlorine into or onto this mixture. The reaction is carried out in the presence or absence of a catalyst. It is advantageous to use the chlorine in excess for the reaction, but at the start of the chlorination reaction an excess of chlorine is not advantageous, since the initially occurring exothermal reaction would become too violent.

Solvents which are inert under the conditions of the reaction are all those solvents which are stable towards chlorine, e.g. chlorinated aliphatic and aromatic hydrocarbons, such as chloroform, carbon tetrachloride, hexachlorocyclopentadiene, octachlorocyclopentene, benzotrichloride, 1,2,4-trichlorobenzene, 1,1,2,3,3-pentachloropropane or 4,5,6-trichloro-2-chlorocarbonyl-pyrimidine itself. Chloroform is especially well suited to be used as solvent.

The proportion by volume between solvent and 4-morpholino-propionitrile is preferably 1 to 20 parts by volume of solvent per 1 part by volume of 4-morpholino-propionitrile. However, it is also possible to operate without a solvent, but the use of a solvent is generally preferred.

The process is preferably carried out in such a manner that 4-morpholino-propionitrile is first mixed with chloroform, and gaseous chlorine is then passed into or onto the mixture in an open or closed vessel. A strongly exothermal reaction initially takes place which necessitates external cooling.

When the exothermal reaction has subsided, the suspension formed by the chlorination reaction is optionally subjected to an ultra-violet irradiation whilst increasing the temperature expediently up to the reflux temperature of the chloroform, while the chlorination proceeds.

A solvent of a higher boiling point than chloroform can be subsequently be added (boiling point up to e.g. 300° C.) and the chloroform removed by distilling it off, for example; alternatively, it is also possible to first retain the chloroform and to distil it off in the further course of the chlorination.

It is obviously also possible to operate from the start in a solvent having a higher boiling point than chloroform (boiling point up to e.g. 300° C.). However, it is particularly advantageous to use chloroform at the start of the reaction because of its especially good solvent power for salt-like intermediate stages.

When the chlorination is carried out in the presence of chlorinating catalysts, iron(III)chloride (0.01 to 2, preferably 0.1 to 1 percent by weight, referred to the starting compound) can be used for the purpose, for example.

The chlorination is generally stopped when the suspension formed in the chlorination reaction by the formation of precipitates has been transformed into a pale yellow solution. A chlorination temperature of about 80° C. should not be exceeded since a complete chlorination of 4-morpholino-propionitrile is not desired.

When the chlorination reaction is completed, the solvent is generally first removed by distillation, when using higher boiling solvents in a vacuum, but the reaction product should not be heated above about 150° C. The chlorination product is subsequently subjected to a cleavage reaction at temperatures of about 150° C. to about 300° C., preferably at about 200° C. to about 250° C. Owing to a strong gas evolution occurring in this connection, it is expedient to carry out the cleavage reaction in each case with such amounts of chlorination product which do not cause too strong an excessive pressure in the cleavage apparatus.

It is particularly advantageous to allow the liquid chlorination product to drop or to run into the hot reaction zone by means of a dosing device, e.g. a dropping funnel or a feed pump. In the simplest case, the cleavage apparatus can consist of a heatable pipe in a vertical or inclined arrangement, through which the chlorination product passes at the cleavage temperature required. The liquid portion of the cleavage products is collected at the lower end of the pipe and expediently subjected to a fractional vacuum distillation through a column in order to obtain 4,5,6-trichloro - 2 - chlorocarbonyl-pyrimidine in the pure state.

The cleavage reaction can also be combined with the vacuum distillation of the cleavage product by heating the chlorination product at the necessary cleavage temperature in a conventional distillation apparatus in a vacuum so that the cleavage product is simultaneously distilled off. The use of a vacuum-film evaporator is of special advantage for readily maintaining the required vacuum and for the safe handling of amounts exceeding 100 g. When the distillation product is cold in the receiver, part of the 4,5,6 - trichloro-2-chlorocarbonyl-pyrimidine already crystallises out (melting point 60 to 61° C.). Further amounts of 4,5,6 - trichloro-2-chlorocarbonyl-pyrimidine can be obtained from the liquid portion of the distillation product by fractional vacuum-column distillation.

It is also possible to subject the chlorination product to the cleavage reaction described above without previously removing the solvent and to separate the original solvent only after obtaining the 4,5,6-trichloro-2-chlorocarbonyl-pyrimidine.

The 4,5,6 - trichloro-2-chlorocarbonyl-pyrimidine obtainable according to the invention is a very valuable intermediate, for example, for the production of reactive dyestuffs or for further reaction with fluorescent agents with the complete or partial exchange of chlorine for fluorine.

EXAMPLE 400 g. (2.86 mol) 4 - morpholino-propionitrile and about 2.5 litres chloroform are introduced into a three-necked flask of 4 litre-capacity, provided with thermometer, gas inlet pipe, stirrer and reflux condenser. A dry chlorine current is initially passed over the vigorously stirred reaction mixture, starting at about 20° C., while externally cooling with ice. Chlorine supply and cooling is adjusted in such a way that the reaction temperature is maintained between about 25 and 35° C. when the reaction temperature decreases to below 25° C. while cooling with ice and in spite of increasing the chlorine supply to about 10 litres per minute, then the chlorine current is passed into the reaction mixture in order to further maintain the reaction temperature at about 25 and 35° C. When the exothermal reaction has subsided, the reaction mixture is treated with an excess of chlorine for about 6 to 8 hours while simultaneously heating it up to the reflux temperature of the chloroform (about 60–65° C.) and under ultra-violet irradiation. About 1 litre carbon tetrachloride is subsequently added and, after stopping the water cooling of the reflux condenser whilst further passing in excess chlorine and continuing the ultra-violet irradiation, a sufficient amount of chloroform is distilled off that, when the water cooling of the reflux condenser is restarted, a reflux temperature of 70 to 71° C. is achieved. This temperature is maintained until the pale yellow suspension progressively formed from the start of the chlorination has turned into a clear, pale yellow solution. The total duration of the reaction lasts for about 12 to 15 hours.

After largely drawing off the solvent in a water jet vacuum, a clear, pale yellow oil is obtained which is introduced dropwise into a vacuum-film evaporator, the oil bath temperature of which is adjusted to 225° C. and in which, before the dropwise addition, a pressure of about 0.5 mm. Hg prevails. The speed of the dropwise addition is regulated in such a way that the vacuum is not lower than 10 mm. Hg. At a pressure of about 7.5 mm. Hg the cleavage product distils at about 192 to 194° C. The total duration of the cleavage reaction lasts about 3.5 hours.

By a subsequent fractional high vacuum distillation of the cleavage product through a column of 0.5 m. length, there is obtained, after liquid, yellow red runnings of about 30 g. a product of the constitution $C_5Cl_4N_2O$ which crystallises in the receiver with a pale yellow colour and has a boiling point of about 120° C./0.25 mm. Hg. Melting point of the colourless crystals 60 to 61° C. from petroleum ether. Yield about 360 g. (about 51% of theory) of 4,5,6 - trichloro-2-chlorocarbonyl-pyrimidine.

Analysis.—$C_5Cl_4N_2O$. (M.W. 245.9). Calculated (percent): C, 24.42; Cl, 57.68; N, 11.39. Found (percent): C, 24.6; Cl, 57.5; N, 11.4.

What is claimed is:
1. 4,5,6-trichloro-2-chlorocarbonyl-pyrimidine.
2. A process for the production of 4,5,6-trichloro-2-chlorocarbonyl pyrimidine comprising the steps of:
   (1) reacting 4 - morpholino-propionitrile at a temperature of about 0° C. to about 80° C. with an excess of gaseous chlorine; and then
   (2) heating the product at a temperature of about 150° C. to 300° C. in the absence of chlorine.
3. The process of claim 2 conducted in the presence of an inert diluent or solvent.
4. The process of claim 2, wherein the step (1) is conducted under ultra-violet radiation.
5. The process of claim 2 which is conducted in the presence of a catalyst selected from the group consisting of iron (III) chloride and antimony (III) chloride.
6. The process of claim 2, wherein the reaction with chlorine is conducted with external cooling in the absence of ultra-violet radiation until the exothermic reaction subsides at which point ultra-violet radiation is applied with continued chlorination and heating.

References Cited

UNITED STATES PATENTS 3,389,069   6/1968   Holtschmidt et al. __ 204—158

ALEX MAZEL, Primary Examiner

R. V. RUSH, Assistant Examiner

U.S. Cl. X.R.

204—158 HA